(12) United States Patent
Post

(10) Patent No.: US 12,657,812 B2
(45) Date of Patent: Jun. 16, 2026

(54) CONVERSION OF THREE-DIMENSIONAL DIGITAL MODEL INTO TWO-DIMENSIONAL ORTHOGRAPHIC PROJECTION IMAGES

(71) Applicant: Sky Castle Studios, LLC, San Francisco, CA (US)

(72) Inventor: Andrew Post, Los Angeles, CA (US)

(73) Assignee: SKY CASTLE STUDIOS, LLC, San Francisco, CA (US)

( * ) Notice: Subject to any disclaimer, the term of this patent is extended or adjusted under 35 U.S.C. 154(b) by 138 days.

(21) Appl. No.: 18/793,739

(22) Filed: Aug. 2, 2024

(65) Prior Publication Data

US 2025/0046006 A1    Feb. 6, 2025

Related U.S. Application Data

(60) Provisional application No. 63/517,903, filed on Aug. 5, 2023.

(51) Int. Cl.
*G06T 15/10*        (2011.01)
(52) U.S. Cl.
CPC .......... *G06T 15/10* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 2016/0353164 A1* | 12/2016 | Smolic | ................. | G11B 27/031 |
| 2023/0196617 A1* | 6/2023 | Zheng | ................. | G06V 10/811 |
| | | | | 382/159 |

* cited by examiner

*Primary Examiner* — Frank S Chen
(74) *Attorney, Agent, or Firm* — ALONZO & ASSOCIATES; Arlyn Alonzo

(57)        ABSTRACT

Aspects of the disclosure are directed to generation of a standee character using an orthographic projection image. In accordance with one aspect, the disclosure is for generating and storing a standee character in a non-transitory memory which includes aggregating a plurality of other points from a plurality of pathwise-connected points to generate an ordered set of line segments; using the ordered set of line segments to generate a configuration of points in one of a plurality of pathwise-connected hulls; using the configuration of points to generate a plurality of spline curves in the one of the plurality of pathwise-connected hulls; and generating a plurality of parametric curves from the plurality of spline curves to generate a normalized cutting path.

16 Claims, 10 Drawing Sheets

110                 120                 130

100

110 120 130

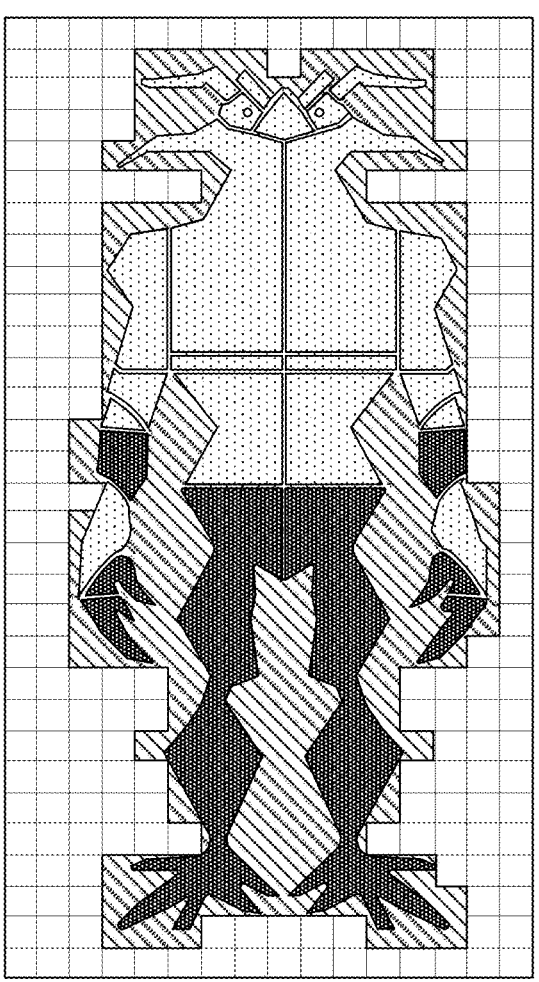
FIG.2

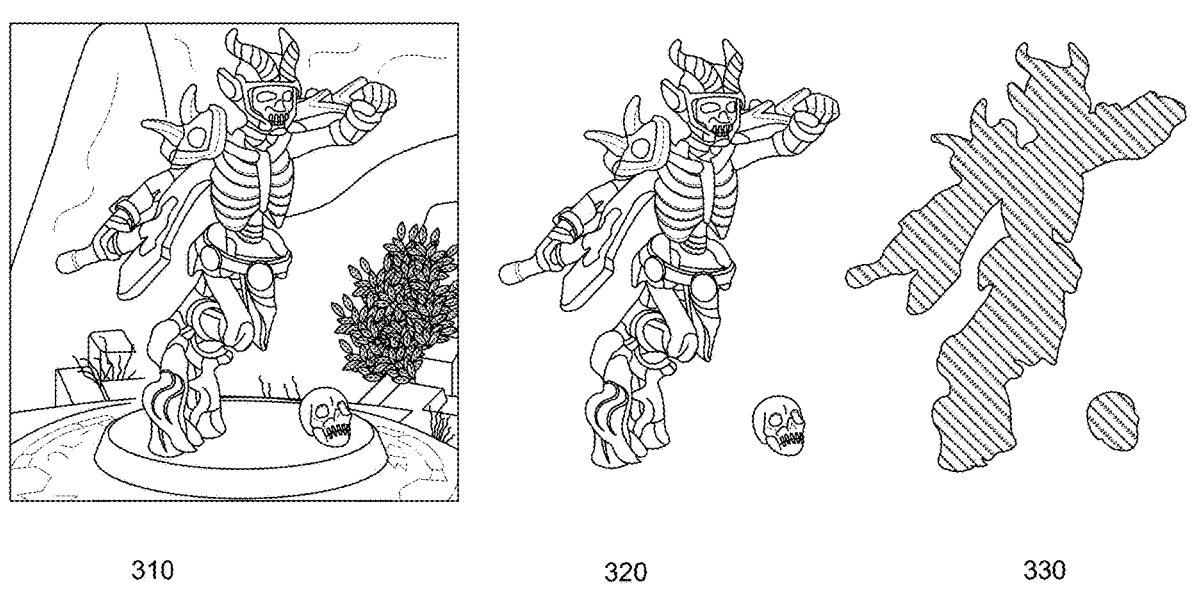
310                320                330
FIG.3

410 420 430

500

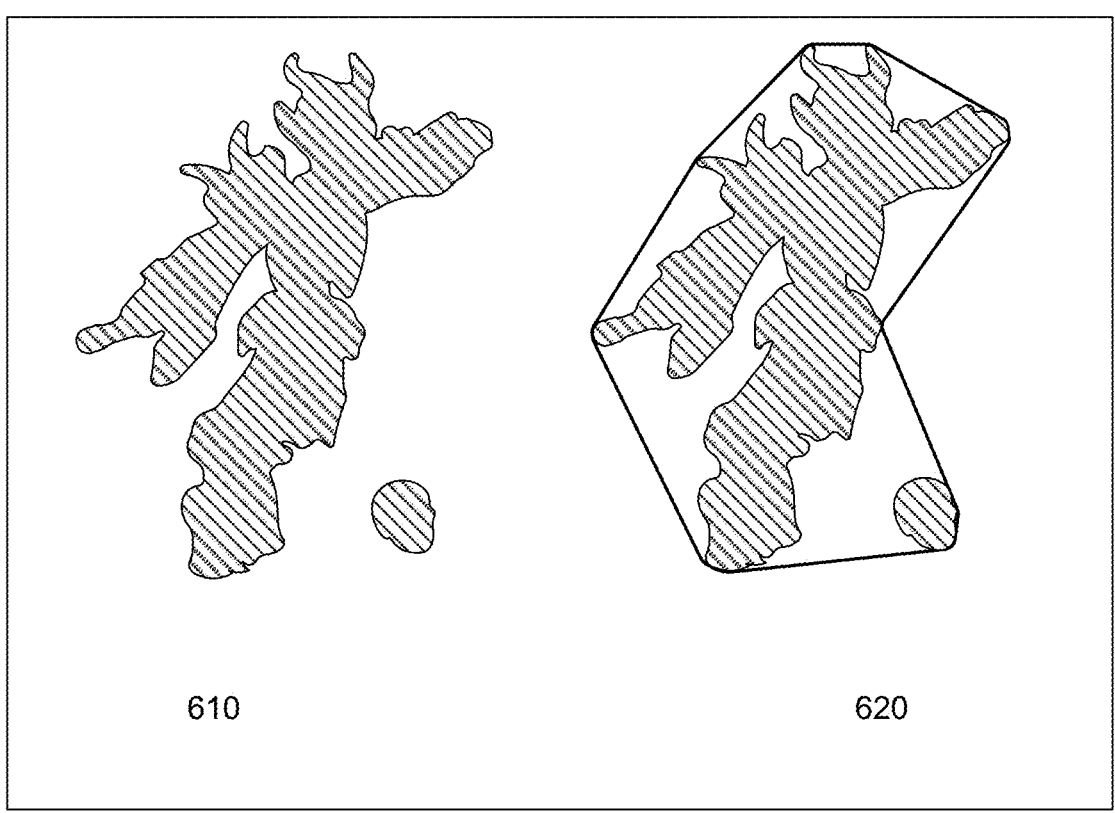
FIG.6

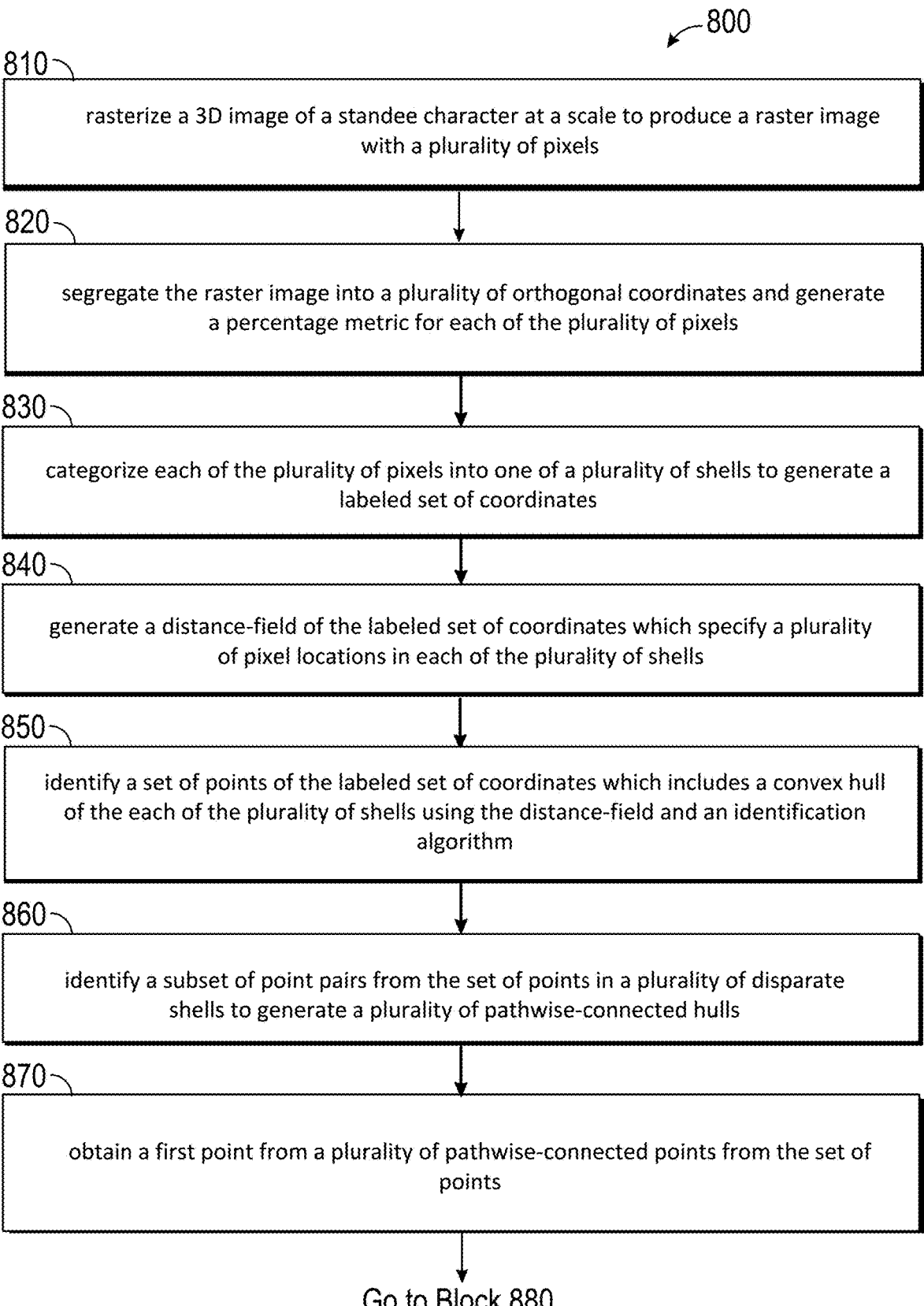

800

810
rasterize a 3D image of a standee character at a scale to produce a raster image with a plurality of pixels 820
segregate the raster image into a plurality of orthogonal coordinates and generate a percentage metric for each of the plurality of pixels 830
categorize each of the plurality of pixels into one of a plurality of shells to generate a labeled set of coordinates 840
generate a distance-field of the labeled set of coordinates which specify a plurality of pixel locations in each of the plurality of shells 850
identify a set of points of the labeled set of coordinates which includes a convex hull of the each of the plurality of shells using the distance-field and an identification algorithm 860
identify a subset of point pairs from the set of points in a plurality of disparate shells to generate a plurality of pathwise-connected hulls 870
obtain a first point from a plurality of pathwise-connected points from the set of points Go to Block 880

Figure 8:
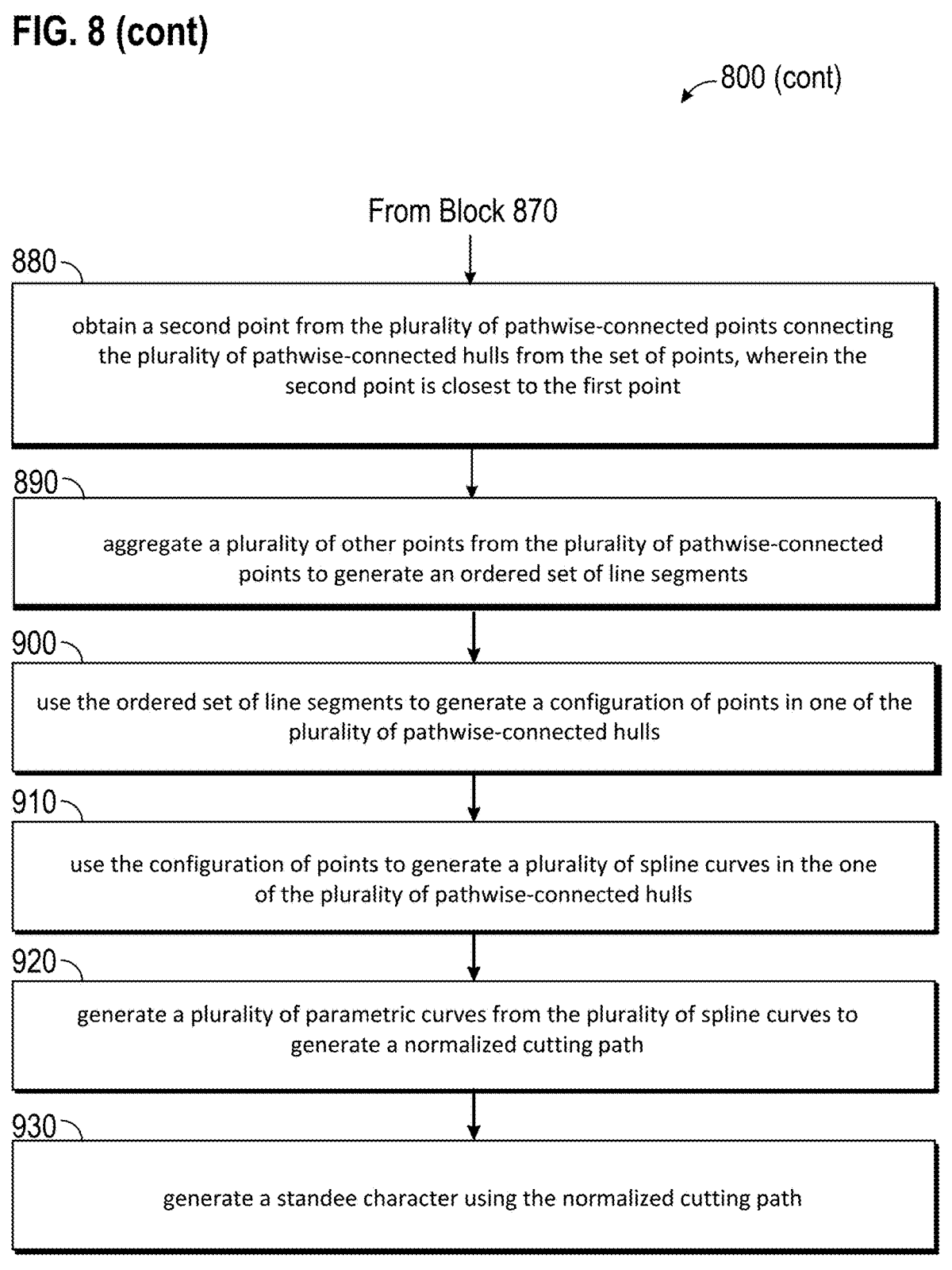

From Block 870

880 obtain a second point from the plurality of pathwise-connected points connecting the plurality of pathwise-connected hulls from the set of points, wherein the second point is closest to the first point

890 aggregate a plurality of other points from the plurality of pathwise-connected points to generate an ordered set of line segments

900 use the ordered set of line segments to generate a configuration of points in one of the plurality of pathwise-connected hulls

910 use the configuration of points to generate a plurality of spline curves in the one of the plurality of pathwise-connected hulls

920 generate a plurality of parametric curves from the plurality of spline curves to generate a normalized cutting path

930 generate a standee character using the normalized cutting path

CONVERSION OF THREE-DIMENSIONAL DIGITAL MODEL INTO TWO-DIMENSIONAL ORTHOGRAPHIC PROJECTION IMAGES

CLAIM OF PRIORITY UNDER 35 U.S.C. § 119

The present Application for Patent claims priority to Provisional Application No. 63/517,903 entitled "CONVERSION OF THREE-DIMENSIONAL DIGITAL MODEL INTO TWO-DIMENSIONAL ORTHOGRAPHIC PROJECTION IMAGES" filed Aug. 5, 2023, and assigned to the assignee hereof and hereby expressly incorporated by reference herein.

TECHNICAL FIELD

This disclosure relates generally to the field of projection imaging, and, in particular, to conversion of three-dimensional digital model into two-dimensional orthographic projection images.

BACKGROUND

Three-dimensional (3D) printing systems are used in a variety of applications which produce a physical assembly of shapes based on a digital model to produce a physical object, such as a two-dimensional (2D) standee character. The digital model may be a 3D digital model which numerically represents an object in three spatial dimensions. The 3D digital model may be modified prior to the production of the 2D standee character. There are many forms of modification that may be used to produce the 2D standee character which aim to synthesize or preserve a desired visual character in the 2D standee character.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides generation of a standee character using an orthographic projection image. Accordingly, the present disclosure discloses a method for generating and storing a standee character in a non-transitory memory, the method including: aggregating a plurality of other points from a plurality of pathwise-connected points to generate an ordered set of line segments; using the ordered set of line segments to generate a configuration of points in one of a plurality of pathwise-connected hulls; using the configuration of points to generate a plurality of spline curves in the one of the plurality of pathwise-connected hulls; and generating a plurality of parametric curves from the plurality of spline curves to generate a normalized cutting path.

In one example, the method further includes generating the standee character using the normalized cutting path. In one example, the method further includes obtaining a first point from the plurality of pathwise-connected points from a set of points. In one example, the method further includes obtaining a second point from the plurality of pathwise-connected points connecting the plurality of pathwise-connected hulls from the set of points, wherein the second point is closest to the first point. In one example, the method further includes identifying a subset of point pairs from the set of points to generate the plurality of pathwise-connected hulls. In one example, the set of points is in a plurality of disparate shells.

In one example, the method further includes identifying the set of points, wherein the set of points is of a labeled set of coordinates which includes a convex hull of each of a plurality of shells using a distance-field and an identification algorithm. In one example, the method further includes generating the distance-field which specify a plurality of pixel locations in each of the plurality of shells. In one example, the method further includes categorizing each of a plurality of pixels into one of the plurality of shells to generate the labeled set of coordinates. In one example, the method further includes segregating a raster image into a plurality of orthogonal coordinates. In one example, the method further includes generating a percentage metric for each of the plurality of pixels. In one example, the method further includes rasterizing a three dimensional (3D) image of the standee character at a scale to produce the raster image with the plurality of pixels.

In one example, the plurality of spline curves includes a continuous piecewise function passing through the configuration of points in the one of the plurality of pathwise-connected hulls. In one example, the method further includes using a plurality of tuned parameters for generating the normalized cutting path. In one example, the method further includes using the plurality of tuned parameters for morphological dilation of a boundary of the distance field. In one example, the method further includes using the plurality of tuned parameters for erosion of a boundary of the distance field.

These and other aspects of the present disclosure will become more fully understood upon a review of the detailed description, which follows. Other aspects, features, and implementations of the present disclosure will become apparent to those of ordinary skill in the art, upon reviewing the following description of specific, exemplary implementations of the present invention in conjunction with the accompanying figures. While features of the present invention may be discussed relative to certain implementations and figures below, all implementations of the present invention can include one or more of the advantageous features discussed herein. In other words, while one or more implementations may be discussed as having certain advantageous features, one or more of such features may also be used in accordance with the various implementations of the invention discussed herein. In similar fashion, while exemplary implementations may be discussed below as device, system, or method implementations it should be understood that such exemplary implementations can be implemented in various devices, systems, and methods.

BRIEF DESCRIPTION OF THE DRAWINGS

FIG. 2 illustrates an example enlarged depiction of a rasterized standee character silhouette.

FIG. 3 illustrates an example raster image of a second standee character, a standee character image with disconnected geometry and a morphological identification of discrete shells requiring connection before manufacture as a standee character.

FIG. 6 illustrates an example of a standee character silhouette and the standee character silhouette with a surrounding continuous hull.

FIG. 8 illustrates an example flow diagram for generation of a standee character using an orthographic projection image.

DETAILED DESCRIPTION

Figure 1:
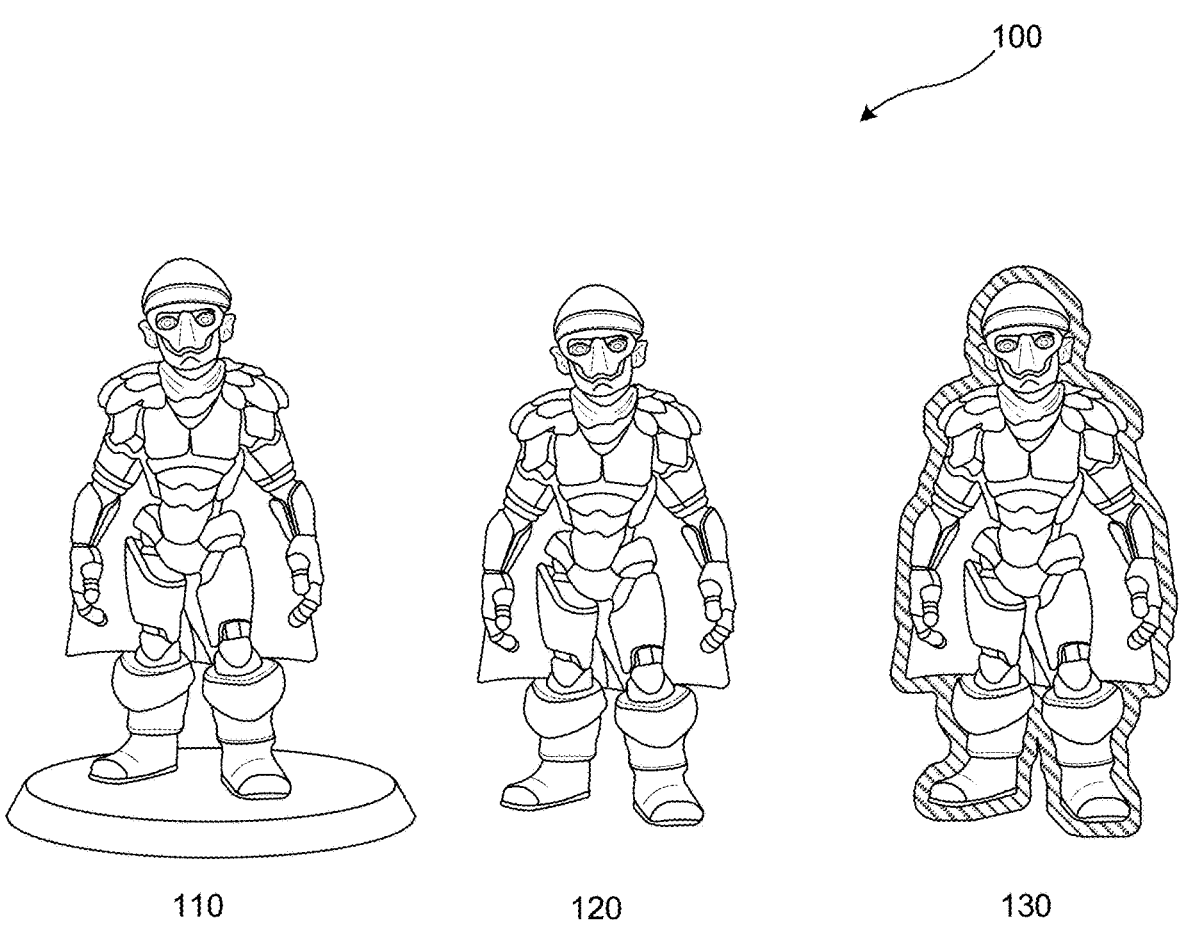
FIG. 1 illustrates an example raster image of a standee character, a standee character image culled of unwanted geometry and a sample morphological dilation of a silhouette of the standee character.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In one example, a 3D digital model is a numeric representation of an object which may be manipulated in a plurality of degrees of freedom (e.g., dimensions) and may be manipulated in a plurality of image characteristics. For example, the numeric representation may be a digital coding of a 3D representation of the object. The digital coding may include, for example, a digital value which specifies image intensity or amplitude. The image intensity or amplitude may be specified for a single monochromatic component (i.e., color) of the object. In one example, the digital value may be linear in intensity (i.e., an increase in intensity maps into a proportional increase in digital value). In one example, the digital value may be logarithmic in intensity (i.e., an increase in logarithmic intensity maps into a proportional increase in digital value). Other functional mappings from intensity (or amplitude) to digital value may also be used.

For example, the manipulation of the 3D digital model may be performed by a processor (e.g., computer, microprocessor, core processor, system on a chip, etc.). In one example, the processor works in conjunction with a non-transitory memory. For example, manipulation in a plurality of degrees of freedom may include translation in three spatial dimensions (e.g., Cartesian coordinates x,y,z), rotation in three spatial dimensions (e.g., rotational coordinates, Euler angles, quaternions, etc.), rescaling (e.g., reshaping), or any combination of these operations. For example, the manipulation in a plurality of image characteristics may include modification of reflectance, transmittance, emittance, angle of reflection, surface roughness, faceting, etc. which affect the visual appearance of an image.

In one example, the 3D digital model may be displayed using graphical techniques which simulate an appearance of a variety of materials, such as, mirrors, metals, plaster, etc. to produce simulated materials. For example, a 3D color printer may not be able to print materials with the same physical properties as the simulated materials. For example, a design goal in 3D printing is to preserve a visual characteristic of simulated materials in a 3D color print. In one example, the 3D printing may modify digital lighting, surfaces, materials, lighting calculations, etc.

In one example, morphing transforms an initial three-dimensional (3D) shape into a transformed 3D shape via an image processing technique. For example, a mesh, indexed by spatial coordinates, may serve as a basis for representing an arbitrary 3D shape. That is, the mesh forms a foundation for the arbitrary 3D shape. For example, the mesh may be a spatially sampled version of the arbitrary 3D shape.

For example, the mesh may be defined by a plurality of vertices or spatial points defined in a spatial coordinate system, for example, rectangular Cartesian coordinates $(x, y, z)$, cylindrical coordinates $(r, \phi, z)$, spherical coordinates $(r, \theta, \phi)$, etc. For example, the arbitrary 3D shape may be synthesized by interconnecting the plurality of vertices. In one example, each of the vertices of the plurality of vertices may be represented by a vector $r_n$ in the spatial coordinate system, where n is an integer index which denotes individual vertices. For example, the vector $r_n$ may be represented by $(x_n, y_n, z_n)$ which are rectangular Cartesian coordinates for a $n^{th}$ vertex of the plurality of vertices. For example, a mesh with N vertices may be defined as a set of vectors $\{r_n\}$, for n=1 to N.

In one example, the initial 3D shape may have a basis using an initial mesh and defined by a plurality of initial vertices. In one example, the transformed 3D shape may have a basis using a transformed mesh defined by a plurality of transformed vertices. For example, morphing may be defined as a mathematical mapping from the initial mesh to the transformed mesh. That is, morphing may transform the plurality of initial vertices to the plurality of transformed vertices using a sequence of incremental transition states. For example, the sequence of incremental transition states may be selected to provide a smooth transition from the initial 3D shape to the transformed 3D shape.

In one example, a mesh may include a plurality of regional meshes. For example, a regional mesh is a subset of the mesh. That is, a plurality of vertices for any regional mesh is a subset of the plurality of vertices for the mesh.

In one example, morphing may be defined as a mathematical mapping from a plurality of initial regional meshes to a plurality of transformed regional meshes. That is, morphing may transform a plurality of initial vertices for each initial regional mesh to a plurality of transformed vertices for each transformed regional mesh.

In one example, morphing from a first 3D shape to a second 3D shape generates a morph. That is, the morph is a 3D shape generated by a transformation from an initial 3D shape. For example, the morph is the transformed 3D shape.

In one example, morphing is a computer graphics technique to interpolate smoothly between two meshes. For example, morphing may start with a first mesh with a plurality of first vertices and transform the plurality of first vertices to a plurality of second vertices. For example, the transformation from the plurality of first vertices to the plurality of second vertices is the only change introduced in the morphing.

In one example, an arbitrary 3D shape represented by a mesh may be converted into a pair of orthographic projection images. For example, the pair of orthographic projection images may be a notional front image and a notional back image of a defined subset of the arbitrary 3D shape. In one example, the pair of orthographic projection images may be transformed into a set of machine-operable instructions to align and form a substrate material into a single-piece silhouette (e.g., upright outline). In one example, the single-piece silhouette (e.g., upright standee character) may form a foundation for the notional front image and notional back image which are numerically printed onto a foundation. In one example, the single-piece silhouette may include a tab which is located in a position such that the silhouette may be placed upright and inserted into a slot from an external substrate with a friction fit perpendicular to the tab.

In one example, the pair of orthographic projection images may be a notional top image and a notional bottom image of a defined subset of the arbitrary 3D shape. In one example, the pair of orthographic projection images may be transformed into a set of machine-operable instructions to align and form a substrate material into a single-piece silhouette (e.g., base outline). In one example, the single-piece silhouette (e.g., base standee character) may form a foundation for the notional top image and notional bottom image which are numerically printed onto the foundation.

In one example, the single-piece silhouette with tab may be inserted into the slot to form a standee character. In one example, the standee character is a visual facsimile of the arbitrary 3D shape. For example, the standee character may be sturdy, inexpensive to produce and easily transportable. For example, the standee character may be commercially available in non-custom and manually designed two dimensional images, for which there is no available original 3D geometry. For example, the standee character may be manufactured from arbitrary 3D shapes using automation.

In one example, the standee character may be automatically manufactured for any geometric configuration to design and produce a humanoid character in either a digital or physical scale model for table-top role-playing games. For example, a user may select an angle of incidence for a normal vector from the arbitrary 3D shape to a centroid of the arbitrary 3D shape to allow for an arbitrary quantity of standee characters generated from a single source.

FIG. 1 illustrates an example raster image 100 of a standee character 110, a standee character image culled of unwanted geometry (e.g., excluding a base) 120 and a sample morphological dilation of a silhouette of the standee character 130.

FIG. 2 illustrates an example enlarged depiction 200 of a rasterized standee character silhouette. In one example, the enlarged depiction shows (shown with diagonal lines) each rasterized pixel in which a non-zero amount of silhouette geometry is apparent.

FIG. 3 illustrates an example raster image 300 of a second standee character 310, a standee character image with disconnected geometry 320 and a morphological identification of discrete shells requiring connection before manufacture as a standee character 330.

Figure 4:
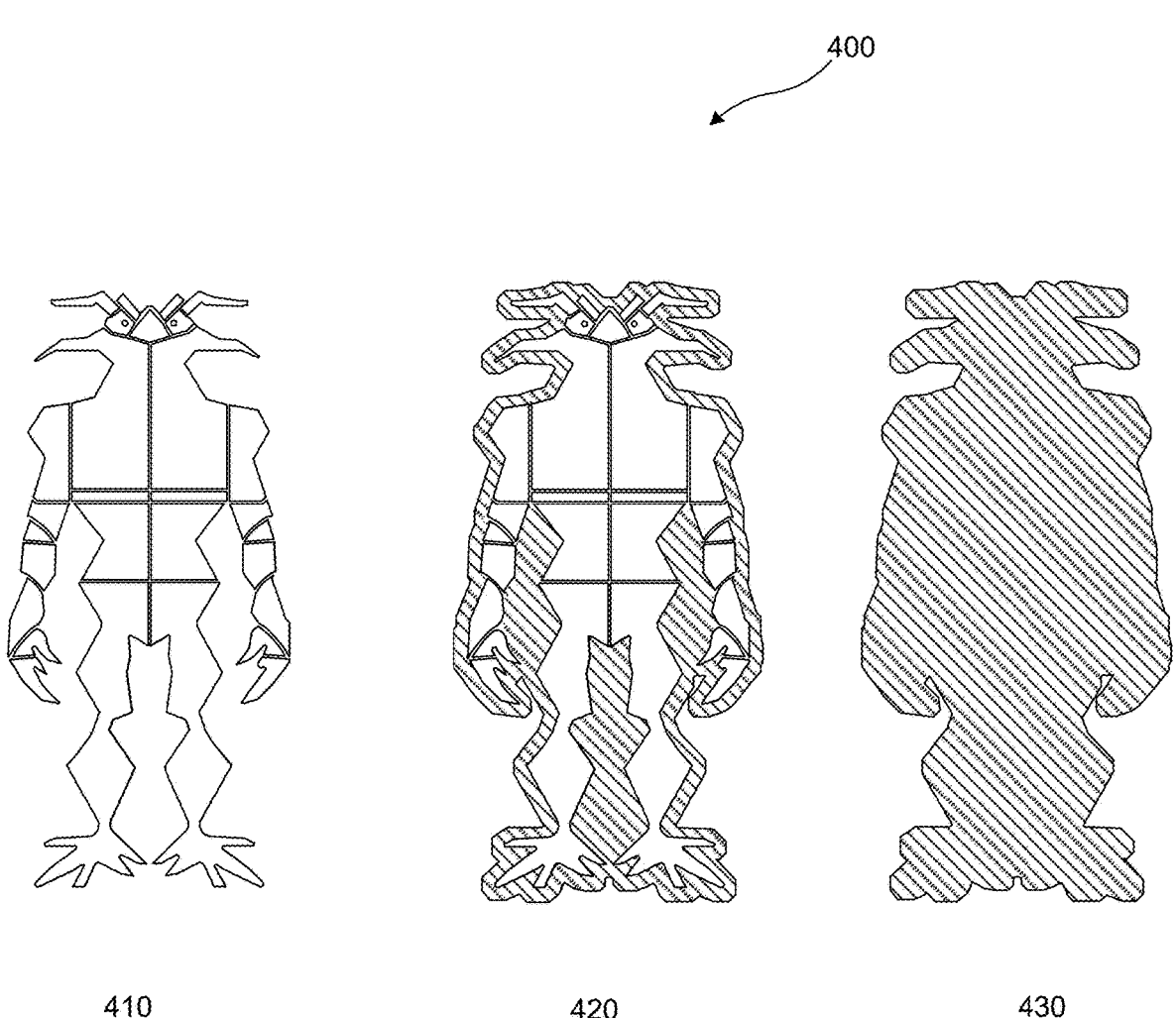
FIG. 4 illustrates an example of a morphologically dilated cut-path around a standee character silhouette, the morphologically dilated cut-path around the standee character silhouette with internal voids filled, and the morphologically dilated standee character silhouette.

FIG. 4 illustrates an example 400 of a morphologically dilated cut-path around a standee character silhouette 410, the morphologically dilated cut-path around the standee character silhouette with internal voids filled 420, and the morphologically dilated standee character silhouette 430.

Figure 5:
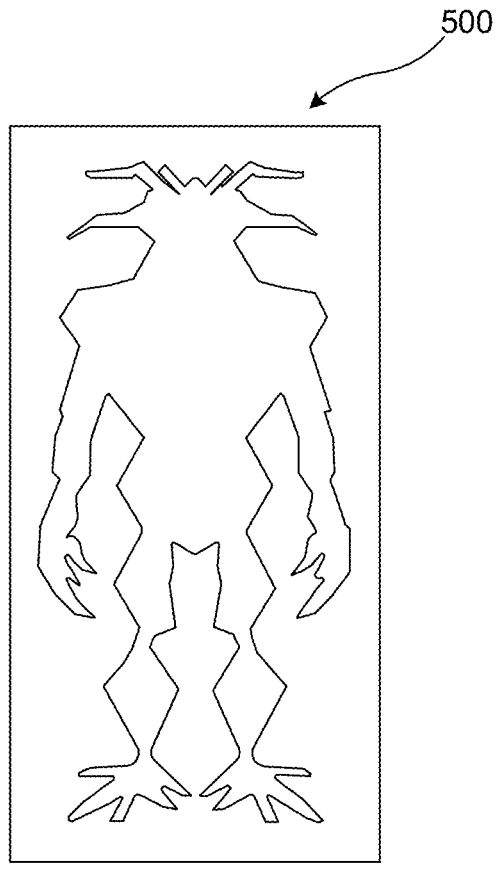
FIG. 5 illustrates an example depiction of a convex hull of a standee character silhouette.

FIG. 5 illustrates an example depiction of a convex hull of a standee character silhouette 500.

FIG. 6 illustrates an example 600 of a standee character silhouette 610 and the standee character silhouette with a surrounding continuous hull 620. In one example, the continuous hull is produced by joining convex hulls of disconnected shells.

Figure 7:
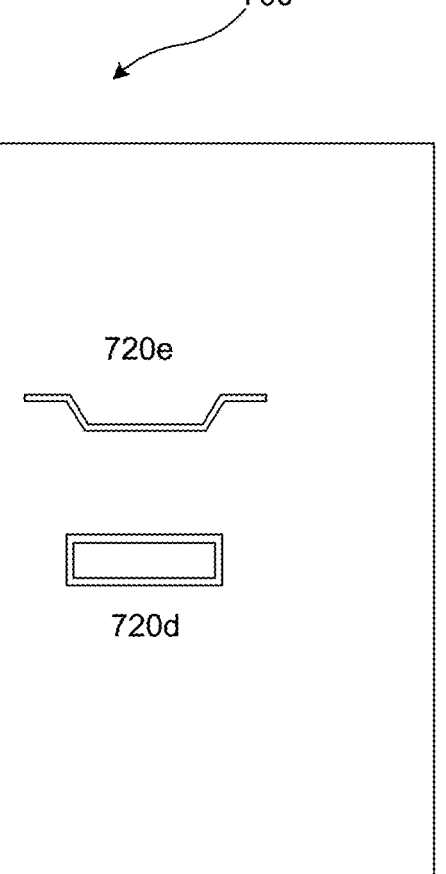
FIG. 7 illustrates an example of a final standee character and slot-and-tab pathing to be inserted into a standee character base (not shown).

FIG. 7 illustrates an example 700 of a final standee character 710 and slot-and-tab pathing 720a, 720b, 720c, 720d & 720e to be inserted into a standee character base (not shown).

In one example, a first process sequence reduces a disjoint and disconnected set of geometries which are arranged in an arbitrary configuration in 3D space to a single standee. For example, the first process sequence performs analysis of orthographic images as follows:

Rasterize an image of the 3D geometry at a scale which will be printed onto a substrate to produce a raster image in a rasterized 2D space with a plurality of pixels.

Segregate the image into a plurality of orthogonal coordinates in the raster image using a flood-fill algorithm and generate some representation for each pixel of the plurality of pixels of an amount of threshold percentage of original geometry within its corresponding 3D voxel space.

Iteratively categorize each pixel of the plurality of pixels into one of a plurality of shells, where each shell is disconnected in the rastered 2D space. In one example, the categorization is performed by a categorization algorithm. In one example, label an arbitrary non-empty pixel which is not yet labeled and extend the same label to other non-empty pixels which satisfy a relationship to the arbitrary non-empty pixel to generate a labeled set of coordinates. In one example, the relationship may include orthogonal adjacency defined by pixel coordinates which differ by some distance in coordinate space.

Generate a distance-field representation of the labeled set of coordinates which specify the pixel locations in each shell of the image, wherein:

a) If the pixel at this corresponding coordinate location in the 2D raster space is an empty pixel, the distance-field at this coordinate shall correspond to a numeric measurement of the distance between the pixel and a non-empty pixel.

b) Otherwise, if the pixel at this corresponding coordinate location in the 2D raster space is a non-empty pixel, the distance-field at this coordinate shall correspond to a negative numeric measurement of the distance between the pixel and a nearest empty pixel c) Together, the distance-field provides a numeric distance of every pixel in the coordinate space from the nearest edge, or transition from the inside to the outside of the silhouette.

d) Furthermore, the distance-field allows efficient morphological dilation or erosion of the boundary transition. For example, the distance-field may be used to produce aesthetically pleasing silhouettes offset from the boundary of the underlying image which result in a smoothed silhouette outline representation for aesthetic, safety or structural stability concerns. In one example, the morphological dilation or erosion also provides for arbitrary manufacturing misalignment tolerances and ensures a minimum radius of curvature and a substrate thickness during manufacturing. In one example, the offset may be set to achieve these goals for which there are field experimental data.

Identify a set of points comprising a convex hull of each shell using the distance-field and an identification algorithm. In one example, the convex hull is a smallest set of coordinates points where an irregular convex polygon with vertices at each point in the convex hull covers all non-empty pixels in the original 2D raster image.

Identify a subset of point pairs (i.e., pairs of points) in disparate shells such that adding connecting lines between these point pairs to generate a pathwise-connected hull wherein each shell is connected to a plurality of shells and a path can be found between any pair of shells along a graph of edges denoting connections between point pairs. In one example, this identification may be performed using a point-cloud algorithm which minimizes a total distance of additional connections or minimizes any other local or global criteria which results in a final product which is more easily manufactured or saleable. For example, field experiments have suggested that connecting each closes pair of shells not already pathwise-connected and iteratively repeating this search and connection may produce a saleable and aesthetically parsimonious result.

In one example, the flood fill algorithm starts with an M×N rastered image. In one example, the flood fill algorithm defines an (M+2)×(N+2) grid which includes the M×N rastered image and a border on all four sides of the grid with border pixels where the pixels on the border have an value of "empty". For example, the border pixels may be white pixels in a grayscale (255) format, white pixels in a color image RGB(255,255,255) format or a transparent pixel in a RGBA(0,0,0,0) format, depending on the image format. In one example, the flood fill algorithm uses a thresholding test for indicating whether a pixel is non-empty. For example, the thresholding test may use a threshold such as any value above midpoint gray level (127) in a 256 color grayscale raster image or may use a percentage metric for which a gradient of values is defined to transition from an empty pixel to a full pixel.

In one example, the flood fill algorithm may define three data structures: an Instructions collection, a Checked Coordinates collection (e.g., to store coordinates still to checked, initialized as empty) and an Exterior Coordinates collection (e.g., to identify exterior coordinates, initialized as empty), where each collection comprises ordered pairs of pixel coordinates In one example, the flood fill algorithm adds any point in the empty exterior frame to the Instructions collection in memory. For example, a viable such point may be a corner of the image at origin (0,0).

In one example, a pseudo-code outline to implement the flood fill algorithm is as follows:

1. While Instructions is not empty
2. Read an ith coordinate from the Instructions collection
3. Remove this ith coordinate from Instructions 4. If the ith coordinate (xi, yi) are inside the (M+2, N+2) coordinate space and if I is not already contained in the Checked Coordinates collection, execute steps:
   i. Add the ith coordinate to the Checked Coordinates collection; this indicates that the flood fill algorithm has been executed on this coordinate and should be executed again
   ii. Read pixel value p at the ith coordinate in the bordered image
   iii. If p has a value below an emptiness threshold, add I to the Exterior collection
   iv. If true, add the coordinates to the left of the ith coordinate, denoted as (x−1,y), to the end of the Instructions collection
   v. Repat for adding the coordinates above the ith coordinate, denoted as (x, y+1), to the Instructions collection
   vi. Repeat for adding the coordinates to the right of the ith coordinate, denoted as (x+1, y), to the Instructions collection
   vii. Repeat for adding the coordinates below the ith coordinate, denoted as (x, y−1), to the Instructions collection.
5. Otherwise, continue iteration from step 2 until Instructions collection is empty
6. Return the list of Exterior Coordinates; that is, all points within the image not exterior may be denoted as interior and connectivity of the interior point may be verified subsequently.

In one example, a shell is a collection of connected points such that a path may be drawn from any point in the collection to another point in the collection without traversing a point not in the shell. In one example, the percentage metric may be used for distinguishing an empty pixel vs. a non-empty pixel and may be used repeatedly by the flood fill algorithm to return a set of connected points.

In one example, the flood fill algorithm returns a set of points which are orthogonally connected to a starting point in the raster image. In one example, all points in the raster image may be an initial set of points, then the flood fill algorithm may be used to label exterior points where the set of all non-exterior points may be labeled as interior points.

In one example, repeated application of the flood fill algorithm on an arbitrary interior point returns a set of points connected to that arbitrary interior point. In one example, if the set of points is all non-exterior points, the raster image contains a single connected shell. In one example, if some interior point is not returned by the flood fill algorithm for the starting point, there are a plurality of shells in the raster image. In one example, each shell of the plurality of shells may be iteratively labeled (e.g., using alphabetic letters as labels for each shell).

In one example, the distance-field is a pre-processing optimization for avoiding duplicate calculations in image analysis, but is not needed subsequently once the set of points has been identified and extracted from the raster image.

In one example, a convex polygon has interior angles less than 180 degrees. In one example, an irregular convex polygon is a convex polygon with different lengths and angles.

In one example, pathwise-connected points may be formed by a line segment between each point pair (i.e., each pair of points), where reference may be transitions from vertices to line segments between vertices. In one example, colinear line segment may be described either as two consecutive line segments (e.g., (0,0)-(0,1) and (0,1)-(0,2) or as a single combined line segment (e.g., (0,0)-(0,2)).

In one example, a second process sequence converts a set of points on convex hulls into a machine-readable set of manufacturing instructions (e.g., command and control planar cutting tool).

Choose an arbitrary point from a set of pathwise connected points in connecting all pathwise-connected hulls to obtain a first point.

Choose a next point from the set of pathwise connected points, closest to the first point and rotated either clockwise or counter-clockwise from a centroid of the set of pathwise connected points.

Adding each other point from the set of pathwise connected points in the same rotational orientation such that each other point is traversed once and in an order which provides a single ordered (connect-the-dots) style set of line segments which approximate a single outline of all hulls in the image.

In one example, a third process sequence converts an ordered set of line segments to generate an ordered connect-the-dots configuration of points in a pathwise-connected hull and generates a plurality of spline curves comprising a continuous piecewise function passing through all points in the pathwise-connected hull and with parametric curves which produce a normalized cutting path with tuned parameters for manufacturing repeatability. For example, usage of the plurality of spline curves avoids slowdowns and acceleration-related cutting head speed variations such as:

For ablative substrate shaping technologies, a constraint that the cutting head spends a longer time within any neighborhood of a single point may increase the probability of manufacturing defects due to overheating Substrate warping from tooling limitations when starting and stopping substrate processing.

Other related manufacturing benefits of cutting paths with locally similar trajectory properties at all cutting path points Minimizing relevant irregularities and manufacturing finish variations.

In one example, the third process sequence converts an ordered set of line segment as follows:

Convert an ordered set of line segments to generate an ordered connect-the-dots configuration of points in a pathwise-connected hull.

Generate a plurality of spline curves comprising a continuous piecewise function passing through all points in the pathwise-connected hull.

Generate parametric curves which produce a normalized cutting path with tuned parameters for manufacturing repeatability.

In one example, the generation of the plurality of spline curves may use Chaikin's algorithm for generating a Bezier type spline curve.

For example, a geometric addition including a Tab or Slot, an image in the same rasterized projection, or coordinate points of a convex hull of the Tab or Slot, allows an automatic means of ensuring the Tab or Slot are attached appropriately to the upright standee character and the base standee character, respectively, such that the standee character assembly is contiguous and structurally sound.

For example, parameter configurations for morphological dilation or erosion of the distance field boundary set identified by the distance field allow for iteration flexibility to adjust to new manufacturing processes and substrates which support:

varying tolerances for substrate printing misalignment and substrate cutting processes varying material tolerances for minimum structural thickness varying product shipping and business tolerance for added material cost vs. breakage rate varying customer preference for substrate aesthetics varying customer preference for substrate edge tactile properties varying aesthetic preference for addition of color-printed borders, such as a cartoon linework contrast outline.

FIG. 8 illustrates an example flow diagram 800 for generation of a standee character using an orthographic projection image. In block 810, rasterize a 3D image of a standee character at a scale to produce a raster image with a plurality of pixels. In one example, the raster image is a sequence of pixels arranged in a 2D grid. In one example, the 2D grid is a rectangular grid. In one example, the scale is determined by a substrate which is used to produce a raster image in a rasterized 2D space with a plurality of pixels. In one example, the 3D image is a plurality of 3D voxels (i.e. volume elements).

In block 820, segregate the raster image into a plurality of orthogonal coordinates and generate a percentage metric for each of the plurality of pixels. In one example, the segregation uses a flood-fill algorithm. In one example, the percentage metric is a proportion of an original geometry with a corresponding 3D voxel space. In one example, the flood-fill algorithm determines an area connected to a cell or pixel in a multi-dimensional array or image.

In block 830, categorize each of the plurality of pixels into one of a plurality of shells to generate a labeled set of coordinates. In one example, each shell is disconnected to other shells in the rasterized 2D space. In one example, the categorization is performed iteratively using a categorization algorithm. In one example, the categorization labels an arbitrary non-empty pixel which is not yet labeled. In one example, the categorization extends the same label to other non-empty pixels which are related to the arbitrary non-empty pixel to generate the labeled set of coordinates. In one example, the relationship may include orthogonal adjacency defined by pixel coordinates which differ by some distance in coordinate space.

In block 840, generate a distance-field which specify a plurality of pixel locations in each of the plurality of shells. In one example, the distance-field is of the labeled set of coordinates. In one example, the distance-field corresponds to a numeric measurement of a distance between an empty pixel (at a corresponding coordinate location in the 2D raster space) and a non-empty pixel. In one example, the distance-field corresponds to a negative numeric measurement of a distance between a non-empty pixel (at a corresponding coordinate location in the 2D raster space) and a nearest empty pixel. In one example, the distance-field provides a numeric distance of every pixel in coordinate space from a nearest edge or a transition from inside to outside of the silhouette. In one example, the distance-field allows efficient morphological (i.e., structural) dilation or erosion of boundary transition. For example, the distance-field may produce aesthetically pleasing silhouettes offset from the boundary of an underlying image resulting in smoothed silhouette outline representation. In one example, the smoothed silhouette outline representation is produced for aesthetic, safety or structural stability reasons. In one example, the morphological dilation or erosion provides for arbitrary manufacturing misalignment tolerances and ensures a minimum radius of curvature and a substrate thickness during manufacturing. In one example, the smoothed silhouette outline may be set to achieve goals based on field experimental data.

In block 850, identify a set of points which includes a convex hull of the each of the plurality of shells using the distance-field and an identification algorithm. In one example, the set of points is of the labeled set of coordinates. In one example, the convex hull is a smallest set of coordinates of the labeled set of coordinates where an irregular convex polygon with vertices at each point in the convex hull covers all non-empty pixels in the raster image.

In block 860, identify a subset of point pairs from the set of points in a plurality of disparate shells to generate a plurality of pathwise-connected hulls. In one example, an addition of connecting lines between the subset of point pairs generates the plurality of pathwise-connected hulls. In one example, each shell of the disparate shells is connected to a plurality of shells. In one example, a path may be found between any pair of shells along a graph of edges denoting connections between point pairs. In one example, the identification of the subset of point pairs may be performed by a point-cloud algorithm. In one example, the point-cloud algorithm minimizes a total distance of additional connections or minimizes any other local or global criteria which results in a final more manufacturable product. For example, field studies have shown that connecting each closest pair of shells which are not pathwise-connected with iteration may produce an aesthetically parsimonious result.

In block 870, obtain a first point from a plurality of pathwise-connected points from the set of points. In one example, the first point is an arbitrary point from the set of points.

In block 880, obtain a second point from the plurality of pathwise-connected points connecting the plurality of path-wise-connected hulls from the set of points, wherein the second point is closest to the first point. In one example, the second point is rotated from a centroid of the plurality of pathwise connected points. In one example, the rotation is clockwise. In one example, the rotation is counter-clockwise.

In block 890, aggregate a plurality of other points from the plurality of pathwise-connected points to generate an ordered set of line segments. In one example, the plurality of other points has the same rotational orientation from the centroid as the second point. In one example, the ordered set of line segments is produced from connected dots. In one example, the aggregation is performed with each point of the plurality of other points traversed once. In one example, the aggregation is performed in an order which provides the ordered set of line segments. In one example, the ordered set of line segments approximates a single outline of all hulls in the raster image.

In block 900, use the ordered set of line segments to generate a configuration of points in one of the plurality of pathwise-connected hulls. In one example, the configuration of points is an ordered configuration of connected dots.

In block 910, use the configuration of points to generate a plurality of spline curves in the one of the plurality of pathwise-connected hulls. In one example, the plurality of spline curves includes a continuous piecewise function passing through all ordered connected dots configuration of points in the pathwise-connected hull. In one example, the plurality of spline curves facilitates manufacturing cutting head operations. For example, usage of the plurality of spline curves avoids acceleration-related cutting head speed variations. For example, cutting head speed variations may be due to overheating in ablative substrate shaping technologies or due to substrate warping due to tooling limitations during starting and stopping substrate processing. For example, usage of the plurality of spline curves facilitates manufacturing by producing locally similar trajectory properties at all cutting path points. For example, usage of the plurality of spline curves minimizes shape irregularities and manufacturing finish variations.

In block 920, generate a plurality of parametric curves from the plurality of spline curves to generate a normalized cutting path. In one example, the normalized cutting path is generated with tuned parameters for manufacturing repeatability. In one example, the tuned parameters are used for morphological dilation or erosion of a boundary of the distance field. In one example, the tuned parameters accommodate different manufacturing processes and substrates. In one example, the different manufacturing processes may be due to varying tolerances for substrate printing misalignment and substrate cutting processes. In one example, the different manufacturing processes may be due to varying material tolerances for minimum structural thickness. In one example, the different manufacturing processes may be due to varying product shipping and business tolerance for added material cost due to a breakage rate. In one example, the different manufacturing processes may be due to varying customer preference for substrate aesthetics. In one example, the different manufacturing processes may be due to varying customer preference for substrate edge tactile properties. In one example, the different manufacturing processes may be due to varying aesthetic preference for addition of color-printed borders (e.g., a cartoon linework contrast outline).

In block 930, generate a standee character using the normalized cutting path. In one example, the standee character may also include a geometric addition. In one example, the geometric addition may be a tab or slot, an image in the same rasterized projection or coordinates of a convex hull of the tab or slot. In one example, the standee character production uses a 3D printer. In one example, the standee character production uses additive manufacturing.

Figure 9:
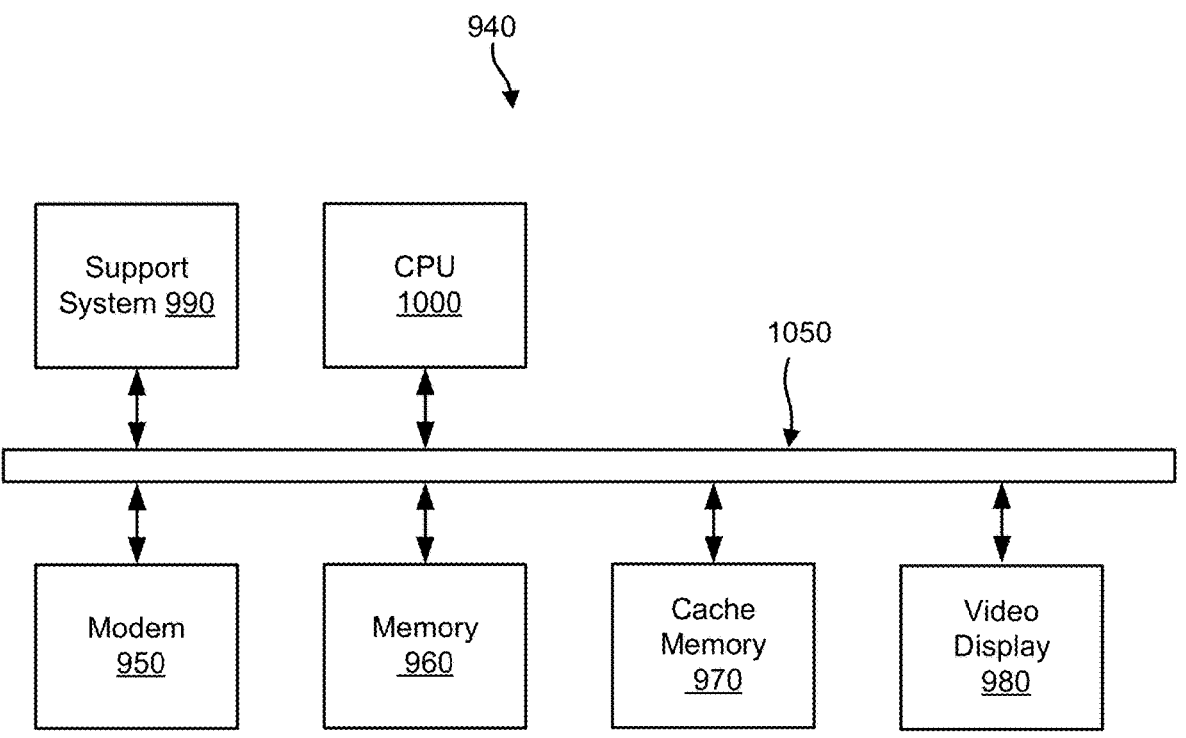
FIG. 9 illustrates an example information processing system.

FIG. 9 illustrates an example information processing system 940. In one example, the information processing system 940 includes a plurality of processing engines such as a central processing unit (CPU) 1000, etc. In one example, various other functions in the information processing system 940 may be included such as a support system 990, a modem 950, a memory 960, a cache memory 970 and a video display 980. For example, the plurality of processing engines and various other functions may be interconnected by an interconnection databus 1050 to transport data and control information.

In one example, the memory 960 and/or the cache memory 970 may be shared among the CPU 1000 and the other processing engines. In one example, the CPU 1000 may include a first internal memory which is not shared with the other processing engines. In one example, the first internal memory is a non-transitory memory.

In one example, any processing engine of the plurality of processing engines may have an internal memory (i.e., a dedicated memory which may be a non-transitory memory) which is not shared with the other processing engines. Although several components of the information processing system 940 are included herein, one skilled in the art would understand that the components listed herein are examples and are not exclusive. Thus, other components may be included as part of the information processing system 940 within the spirit and scope of the present disclosure.

In one example, one or more processing engines in the information processing system 940 may be aggregated into a single integrated circuit known as a system on a chip (SOC). In one example, the SOC may include the central processing unit (CPU) 1000 and other processing engines. The SOC may also include the memory 960 and the cache memory 970. In one example, the memory 960 and the cache memory 970 are each non-transitory memories.

In one example, the information processing system 940 may be used to execute one or more steps of FIG. 8. In one example, the information processing system 940 may be part of a wireless device in a wireless communication system.

In one aspect, one or more of the steps for generation of a standee character using an orthographic projection image in FIG. 8 may be executed by one or more processors which may include hardware, software, firmware, etc. The one or more processors, for example, may be used to execute software or firmware needed to perform the steps in the flow diagram of FIG. 8. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in a processing system, external to the processing system, or distributed across multiple entities including the processing system. The computer-readable medium may be embodied in a computer program product. By way of example, a computer program product may include a computer-readable medium in packaging materials. The computer-readable medium may include software or firmware. Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

One skilled in the art would understand that various features of different embodiments may be combined or modified and still be within the spirit and scope of the present disclosure.

What is claimed is:

1. A method for generating and storing a standee character in a non-transitory memory, the method comprising:

aggregating a plurality of other points from a plurality of pathwise-connected points to generate an ordered set of line segments;

using the ordered set of line segments to generate a configuration of points in one of a plurality of pathwise-connected hulls;

using the configuration of points to generate a plurality of spline curves in the one of the plurality of pathwise-connected hulls; and generating a plurality of parametric curves from the plurality of spline curves to generate a normalized cutting path.

2. The method of claim 1, further comprising generating the standee character using the normalized cutting path.

3. The method of claim 2, further comprising obtaining a first point from the plurality of pathwise-connected points from a set of points.

4. The method of claim 3, further comprising obtaining a second point from the plurality of pathwise-connected points connecting the plurality of pathwise-connected hulls from the set of points, wherein the second point is closest to the first point.

5. The method of claim 4, further comprising identifying a subset of point pairs from the set of points to generate the plurality of pathwise-connected hulls.

6. The method of claim 5, wherein the set of points is in a plurality of disparate shells.

7. The method of claim 5, further comprising identifying the set of points, wherein the set of points is of a labeled set of coordinates which includes a convex hull of each of a plurality of shells using a distance-field and an identification algorithm.

8. The method of claim 7, further comprising generating the distance-field which specify a plurality of pixel locations in each of the plurality of shells.

9. The method of claim 8, further comprising categorizing each of a plurality of pixels into one of the plurality of shells to generate the labeled set of coordinates.

10. The method of claim 9, further comprising segregating a raster image into a plurality of orthogonal coordinates.

11. The method of claim 10, further comprising generating a percentage metric for each of the plurality of pixels.

12. The method of claim 11, further comprising rasterizing a three dimensional (3D) image of the standee character at a scale to produce the raster image with the plurality of pixels.

13. The method of claim 1, wherein the plurality of spline curves includes a continuous piecewise function passing through the configuration of points in the one of the plurality of pathwise-connected hulls.

14. The method of claim 1, further comprising using a plurality of tuned parameters for generating the normalized cutting path.

15. The method of claim 14, further comprising using the plurality of tuned parameters for morphological dilation of a boundary of the distance field.

16. The method of claim 14, further comprising using the plurality of tuned parameters for erosion of a boundary of the distance field.

\* \* \* \* \*